April 2, 1929.  M. ERCEG  1,707,630
WASHERLESS FAUCET
Filed Aug. 4, 1926
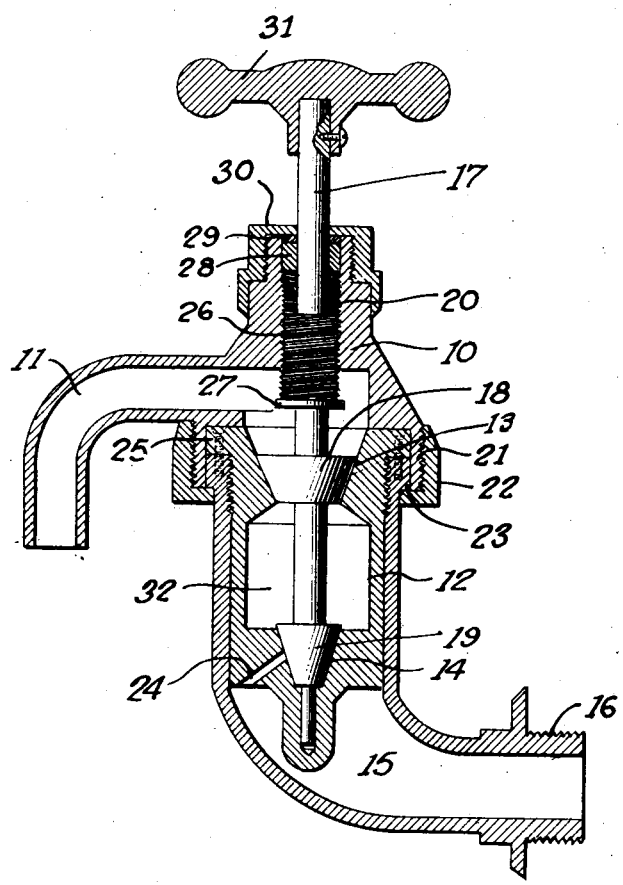
Inventor
Michael Erceg.
By his Attorney
Daniel L. Morris Patented Apr. 2, 1929.

1,707,630

UNITED STATES PATENT OFFICE.

MICHAEL ERCEG, OF NEW YORK, N. Y.

WASHERLESS FAUCET.

Application filed August 4, 1926. Serial No. 126,962.

This invention relates to faucets and has reference more particularly to faucets in which the valve structure is such that a water tight closure is obtained without the use of washers.

The object of the invention is to provide a simple, durable faucet in which the use of washers may be eliminated.

A further object of my invention is to provide a faucet in which a plurality of valves are located between the inlet and outlet of the faucet.

Briefly, my invention comprises a faucet having two valve seats, preferably integrally formed, positioned within the faucet body between the inlet and the outlet. Two valves adapted to fit in the said valve seats are mounted upon a single stem or spindle. The upper valve seat is made of slightly greater diameter than the lower valve seat in order to permit the lower end of the spindle and the lower valve to be initially passed therethrough, as for example, when the faucet is being assembled. This arrangement providing a plurality of valves through which a fluid supplied to the faucet must flow successively constitutes a very efficient structure, since any fluid escaping through the lower valves will be checked by the upper valve, which closes simultaneously with the lower valve. The structure of the valve seats is such that a water tight closure is obtained without the use of washers or any form of packing.

In the figure I have shown the structure of my faucet in vertical cross-section.

Referring to the drawing, numeral 10 represents a faucet body having a nozzle, 11. A plug, 12, is provided positioned in the end of an inlet pipe, 15. The plug, 12, comprises the integrally formed valve seats, 13 and 14. The inlet pipe, 15, may be connected to a fluid supply source in any convenient manner as by the external screw threads, 16. A spindle, 17, is provided, having mounted thereon the two valves, 18 and 19, adapted to seat respectively in the valve seats, 13 and 14. The faucet body, 10, has a central opening through its upper portion constituting a bore, 20, in which the spindle, 17, is threaded. The lower portion of the faucet body consists of an annular collar forming a female member, 21, adapted to receive the end of the pipe, 15. The plug, 12, is initially secured in the end of the pipe, 15, and the assembly is then inserted into the female member, 21, and secured therein by means of a collar, 22, which fits against the shoulder 23, of the inlet pipe and threadedly engages with the exterior of the member, 21.

The plug, 12, is substantially in the form of a hollow cylinder, open at the upper end. At its top it has an annular flange forming a cone shaped opening which constitutes the upper valve seat, 13. The plug is closed at its lower end, but has a cone shaped depression therein constituting the lower valve seat, 14. A number of passage ways or vents, 24, diverging from the inner periphery of the lower valve seat and inclined thereto substantially at right angles, extend through the bottom of the plug thereby connecting the lower end of the supply pipe with the inside of the lower valve seat. The upper valve seat, 13, is designed to be of greater diameter than the lower valve seat, 14, in order to permit the end of the spindle, 17, and the valve, 19, to be initially passed therethrough.

The plug, 12, mounted in the end of the inlet pipe, 15, is preferably threadedly engaged therein. The plug member is further provided at its end with an annular flange, 25, extending over the end of the pipe to which it is secured by means of screws extending longitudinally into the end of the pipe.

The spindle, 17, upon which the integrally formed valves, 18 and 19, are mounted, has at its upper end a portion, 26, of enlarged diameter constituting the part which is threaded to engage with the correspondingly threaded interior surface of the bore 20. At the lower end of the portion, 26, is an annular flange, 27, which serves as a stop to prevent the spindle from being turned more than a predetermined amount. Around the upper end of the spindle and interiorly of the bore 20 is placed the packing, 28, and a gland, 29, which are held in place by means of a gland nut, 30, adapted to threadedly engage the upper exterior surface of the faucet body. The spindle is provided with a handle, 31, secured thereon in any convenient manner, as by a screw. When the spindle, 17, is turned the valves, 18 and 19, will be opened simultaneously, permitting the fluid to flow from the pipe, 15, through the inclined vents, 24, into the lower valve seat and thence into the hollow central portion, 32, of the plug member through the valve seat, 13, and out through the nozzle, 11.

It will be readily apparent that the inclined passage ways or vents, 24, in the lower end of the plug, 12, through which the fluid must flow to reach the interior of the valve seat, 14, will be effectually closed when the valve, 19, is seated and any fluid which may have passed through these vents will be locked in the chamber, 32, by the closing of the valve, 18. The faucet structure disclosed herein is not only very durable, but has the great advantage of not requiring washers or other parts which tend to wear quickly, causing leakage of the valve.

While I have shown a single embodiment of my invention for the purpose of fully disclosing the same many modifications may be made in the arrangement and configuration of the parts without departing from the scope of my invention, which is defined in the following claims.

I claim:

1. A faucet having a substantially cylindrically shaped unitary member comprising two valve seats, said member having an annular flange at its top forming an upper valve seat and having a cone shaped cavity at its bottom, constituting a second valve seat, said cone shaped cavity being closed at its lower end, and having means for leading a fluid thereto comprising a plurality of inclined passage ways extending from the periphery of the valve seat through the bottom of the seat member.

2. A faucet having an upper and a lower valve seat integrally joined together, co-operating upper and lower valves adapted to seat simultaneously in the respective valve seats, said upper valve seat being open at both ends and somewhat greater diameter than the lower valve seat, the said lower valve seat being closed at its lower end, but having a number of passage ways extending through its side walls and inclined thereto at an angle of approximately 90°.

3. A washerless faucet comprising a body, an inlet pipe, and an annular plug closed at its lower end and positioned in the end of said inlet pipe, said plug having an annular flange at its top constituting an upper valve seat and having a conical depression in the upper surface of its closed lower end, constituting a lower valve seat, said plug having a number of inclined passage ways extending radially therethrough from the interior of said lower valve seat through its said lower end.

4. A faucet having a body portion, a nozzle, two integrally formed valve seats located within the body, means for introducing fluid under pressure below the lower of said valve seats, a number of converging passage ways extending through the wall of said lower valve seat, said passage ways being inclined substantially at right angles to the side of said valve seat, a valve seated in each of said valve seats, said valves being mounted upon a spindle having a portion of enlarged diameter adapted to threadedly engage with a bore extending through the upper portion of the body and means for rotating said spindle so as to move the valves to open position.

In testimony whereof, I have signed my name to this specification this 30th day of July, 1926.

MICHAEL ERCEG.